United States Patent Office 2,828,799
Patented Apr. 1, 1958

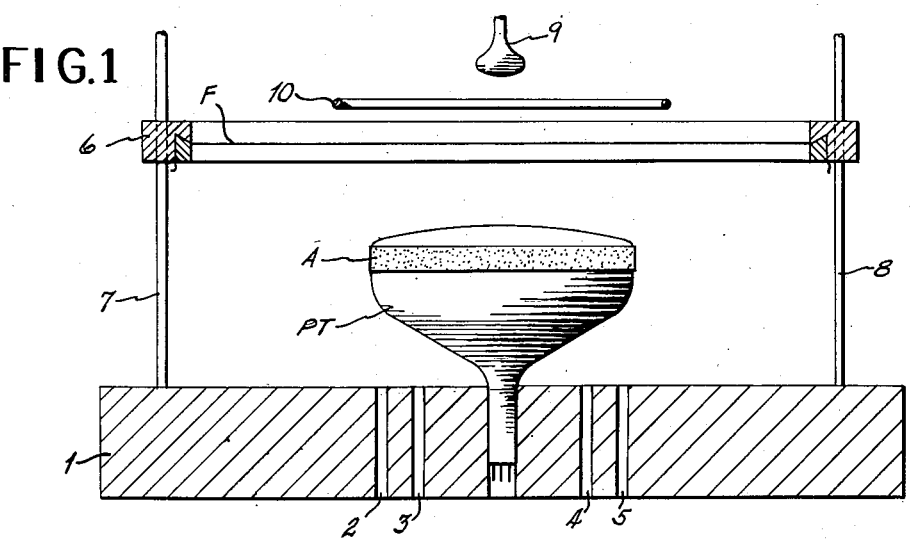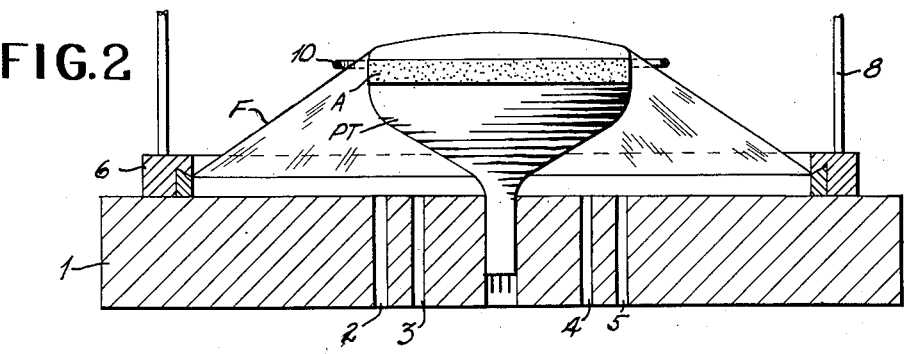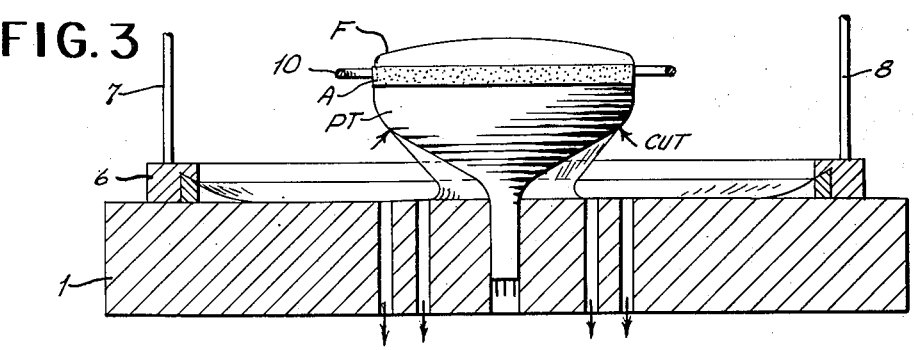

2,828,799

PROCESS OF ENVELOPING SHAPED OBJECTS

Wilbur E. Harrison, Jr., Wilmington, Del., assignor to E. I. du Pont de Nemours and Company, Wilmington, Del., a corporation of Delaware Application October 10, 1955, Serial No. 539,352

7 Claims. (Cl. 154—41)

This invention relates to a shatterproof covering and, more particularly, to providing breakable, shaped objects of glass with a closely-adhered covering of polyethylene terephthalate film.

There is an ever-increasing demand for a shatterproof, skin-tight covering for breakable, shaped objects such as photoflash bulbs, incandescent lamp bulbs, glass bottles, vitreous light shades, cathode ray tubes, fluorescent light tubes, etc., which will not be readily detectable (i. e., noticeable) and which will not impair the functions of the object covered. Because of its unique combination of strength, toughness, clarity, resistance to the deleterious action of chemical reagents, etc., polyethylene terephthalate film has been suggested as an ideal candidate to fulfill this demand. However, the difficulty has been to find a satisfactory process for applying the film as a skin-tight covering to the breakable objects to be protected.

An object of the present invention, therefore, is to provide an economical, rapid process for applying and closely adhering films of polyethylene terephthalate to selected surface areas of breakable, shaped objects whereby to render these areas shatterproof. Another object is to provide a process for applying oriented, heat-set, crystalline, polyethylene terephthalate film as a skin-tight covering for selected surface areas of breakable, shaped objects. Still another object is to provide for the application of oriented, heat-set, polyethylene terephthalate as a closely-adherent, shatterproof covering over the face of television picture tubes. These and other objects will more clearly appear hereinafter.

The above-stated objects are realized by the present invention which, briefly stated, comprises the steps of clamping a sheet of polyethylene terephthalate film around its perimeter, heating the film to an elevated temperature within the range of from the softening temperature of the film to a temperature 10° C. below the crystalline melting point of the film, preferably within the range of from 150°–200° C., immediately thereafter draping the heated film over the shaped object while continuing to heat the film areas already elongated and to be elongated subsequently to conform to the surface contours of the shaped object to a temperature within said range, and thereafter while maintaining film areas to be elongated within said specified temperature range, applying uniform pressure upon the film to shape the film snugly against the shaped object while continuing to heat said film in said areas to a temperature within said temperature range, and cooling the film while maintaining the applied pressure.

While the process of this invention may be carried out with substantially amorphous, unoriented film, or with oriented, non-heat-set film (this film being shrinkable at elevated temperatures), it is particularly adaptable for shaping polyethylene terephthalate film which has been elongated in both directions to form a film having substantially the same physical properties as measured in both directions (longitudinal and transverse directions) and one which has been heat-set (maintained at an elevated temperature while maintaining the film under tension to restrict any dimensional change) at an elevated temperature of at least 150° C., and preferably, at 200°–250° C. Preferably, the polyethylene terephthalate film has been oriented by elongating the film to an extent of at least 200% by stretching the film in both directions, or by rolling the film in both directions, or by a combination of stretching in one direction and rolling in a second direction.

The film, suitably clamped at its perimeter, may be uniformly heated over its entire surface to a temperature within the specified range before it is shaped over the surface to be covered or it may be heated to a higher temperature (within the range) in selected areas which are to be elongated in the subsequent forming operations than in the areas of the film which are not to be drawn to any significant degree in the subsequent forming operations. This latter embodiment is known as pattern heating. Whether or not pattern heating is employed as a part of this process depends chiefly upon the configuration of the shaped object to be enveloped by the present process. The preferred embodiment of this invention is that of enveloping cathode ray tubes for television sets, i. e., television picture tubes, and the like. In such cases, the film is preheated to a lesser degree in that area of the film which covers the actual face of the tube. This portion is normally heated to a temperature well below the crystalline melting point (255° C.) or preferably below 150°–170° C. On the other hand, the film area which is to be drawn around the side portions of the tube is usually heated to a higher temperature in the neighborhood of 150°–200° C. and upwards, but not above 10° C. below the crystalline melting temperature of the oriented film. For polyethylene terephthalate film elongated 200% in both directions and heat-set at about 200° C., the crystalline melting temperature, which is the lowest temperature at which the crystalline structure is no longer observed by a polarizing microscope, is about 255° C.

In preheating the clamped film (clamped around its entire perimeter) the oriented crystalline film, even though it may have been heat-set at elevated temperatures of 200°–225° C., will shrink in the clamping frame and to such a degree that the film will be placed under considerable tension. The critical time at which the heated film should be draped over the shaped object is apparently that moment at which the film tends to vibrate, and this can be readily detected by viewing the film at an angle and observing vibratory changes in the angle of surface reflection. In any event, it is critical that the film temperature not be permitted to reach the crystalline melting point.

The source of heat utilized in apparatus designed to carry out the present process will depend chiefly upon the design of any particular apparatus. Sources of radiant heat, such as electrically heated metal rods which are heated to a red glow, are quite often preferred over the use of hot air convection currents which may be directed upon pertinent areas of the film. Infrared heating lamps may also be employed to advantage in directing heat upon pertinent portions of the film before and during the shaping operation.

The film is shaped snugly against the object to be enveloped by the application of uniform pressure upon the upper film surface. This pressure may be developed in a variety of ways. Atmospheric pressure may be utilized by evacuating the atmosphere enclosed by the film which has been draped over the object to be enclosed. On the other hand, pressures greater than atmospheric may be applied upon the film by applying compressed air upon the film to shape it around the object to be enveloped.

Any other techniques of applying a positive pressure upon the film may be employed, such as the application of steam pressure, or the use of mechanical pressing means.

In most instances, it is preferred to provide an adhesive bond between at least portions of the skin-tight film and the underlying surface it is to protect. In addition to more firmly anchoring the protective film in place, the adhesive layer will insure a greater degree of protection from shattering in that the glass will tend to stick to the film surface even though the film may be ruptured. An adhesive coating may be applied to the entire area of the shaped object to be covered by the film, or to portions only of the shaped object to be enveloped by the film. Alternatively, a heat-activated adhesive coating may be similarly applied to the polyethylene terephthalate film prior to carrying out the above process.

The preferred types of adhesives are those which are activated by heat at temperatures employed in the process. As representative adhesives suitable for purposes of this invention, there may be mentioned: EC-826, an adhesive based on a copolymer of butadiene and acrylonitrile (manufactured by Minnesota Mining & Mfg. Co.), Adhesive No. 4684, a synthetic rubber base adhesive (manufactured by E. I. du Pont Co.), Adhesive No. 50R-2632, a lacquer type adhesive (manufactured by National Adhesives Co.), and Adhesive No. XL-33-27-435, a lacquer type adhesive (manufactured by the Union Paste Co.).

A preferred embodiment, namely the application of a biaxially-oriented, balanced, heat-set polyethylene terephthalate film over the face of a television picture tube, will now be described with reference to the accompanying drawing wherein:

Fig. 1 is a diagrammatic representation, with parts in cross-section, of an arrangement of apparatus suitable for carrying out the first step of the process, Fig. 2 similarly illustrates the second step of the process; and, Figure 3 similarly illustrates the third step of this preferred embodiment of the invention.

Referring to Fig. 1, the legend 1 denotes a wooden platform specifically designed for supporting a television picture tube, PT, of a conventional contour. This platform is provided with a series of holes 2, 3, 4 and 5 which are connected to a vacuum pump (not shown). A metal frame, 6, which is employed for tightly clamping a film, F, along all four sides is shown mounted above the platform. This frame is mounted to slide vertically along rod supports, 7 and 8, which permit lowering the frame rapidly upon the platform. A source of infrared radiation (or other type of radiant heating source), 9, is mounted directly above the clamping apparatus in such a position that the infrared radiation is directed upon the center of the film to be shaped. Another heat source, 10, is an electrically heated rod (or rods) in the form of a rectangle. This rod is provided with electrical heating means capable of heating it to a steady red glow; and it is designed to move vertically with the clamping frame by any suitable means (not shown) so that when the frame is pressed tightly against the tube-supporting platform, the heating apparatus is in a position which surrounds the edges of the television picture tube. This rectangular heating apparatus directs continuous heat upon those areas of the film which are being elongated and are to be elongated to the greatest extent during the shaping operation. Continuous heating of these areas provides for forming a skin-tight envelope around the television picture tube with a minimum of compression forces exerted upon the body of the tube.

Fig. 2 illustrates the second step of the present process wherein the clamping frame is lowered into contact with the tube-supporting platform and the softened film is draped over the face of the tube. Fig. 2 also shows that the heating rod moves to a new position in order to direct heat upon those portions of the film which are to be formed over the sides of the tube.

Fig. 3 illustrates the step of applying a vacuum source to the platform supporting the tube in order to suck air from the atmosphere enclosed by the draped film. As the pressure in this enclosed area is reduced, atmospheric pressure forces the film snugly against the sides of the picture tube, and this is illustrated by Fig. 3.

Referring to the above drawing of a typical apparatus employed to carry out the present process, a sheet of oriented, (elongated 200% in both directions) heat-set, (at about 200° C.) polyethylene terephthalate film (26" x 30" and 0.0075" in thickness) was clamped tightly on all four sides in a metal frame and held about 4" below an infrared lamp and an electrically heated rod (in the shape of a rectangle) which was heated to glow with an even red heat. With this combination of heating sources, the center portion of the film which was to be formed over the face of a television picture tube was heated to a temperature somewhat below 170° C., whereas the area surrounding this middle portion was heated to a higher temperature of about 170°-200° C. but below the crystalline melting temperature about 255° C.) of the film. The area heated to the higher temperature was that which was to be stretched and formed over the sides of the television picture tube.

Prior to initiating the shaping operation by heating the film, an adhesive composition, A, comprising a dispersion of a phenol-aldehyde resin in a solvent solution of a copolymer of butadiene and acrylonitrile was applied to the sides of the television picture tube, and the solvent was permitted to evaporate from the solids content of the adhesive composition.

Upon heating the clamped film with the heat sources described above, the film shrank (about 2-4%) rapidly to the extent that it was stretched very tightly in the clamping frame. At the point where the tightly-stretched film began to vibrate slightly, as can be observed by watching vibrating reflections from the surface of the film, the clamp was lowered rapidly upon the platform supporting the television picture tube to form an airtight seal between the lower face of the clamp and the upper surface of the platform. This step draped the softened film over the face of the television tube, and in the same operation the rectangular heating element was lowered to a position substantially concentric with the edges of the tube in order to continue heating this area of the film.

At this point, a vacuum was drawn upon the atmosphere enclosed by the draped film; and as the air pressure in this enclosed atmosphere was reduced, atmospheric pressure surrounding the draped film forced the film snugly against the surfaces of the picture tube. As this forming was taking place, the heating element was lowered further to continue heating the film area in contact with the edges of the tube in addition to heating the adhesive composition applied to the tube. By activating the adhesive composition, a firm bond between film and glass tube was effected. At this stage, the vacuum was maintained and the rod heating source was raised and removed from a position surrounding the edges of the tube. The film was permitted to cool substantially to a temperature approaching room temperature before the vacuum was broken. As a final step, the excess film was trimmed from the television picture tube at a point below the adhesive layer.

By maintaining a vacuum in the atmosphere enclosed by the film up to the point where the film has been cooled to substantially room temperature, the shaped film is in essence heat-set in its new shape, and any shrinkage which may take place at elevated temperatures prior to releasing the vacuum is avoided.

When one or more layers of heat-set polyethylene terephthalate film are formed about the face of a tube, in the manner described hereinbefore, there results a protective cover which is capable of containing flying glass fragments resulting from imploding an activated (one which has been evacuated to a very low pressure) picture tube. The envelope of film serves as a protective barrier between the picture tube and the television viewer when the enveloped picture tube is mounted in a television set. When a television picture tube is purposely or accidentally imploded, the enveloping film serves to protect the television viewer from flying glass resulting from the explosion phase of the implosion-explosion reaction, and glass particles are blown against the back of the television receiver. This application is exemplary of just one of the many end uses which may be served by applying an enveloping film of oriented, heat-set polyethylene terephthalate to glass containers of all varieties. The present process may also be readily employed for applying tamperproof coverings over bottles which have already been closed with a bottle cap, cork, or the like.

The principal advantage of the present process is that it provides for forming an extremely strong and tough polyethylene terephthalate film around shaped objects which are not capable of withstanding excessive compressive forces. Such types of shaped objects are typically represented by incandescent light bulbs, photoflash bulbs, fluorescent lighting tubes, and cathode ray tubes, glass bottles, etc.

It should be emphasized that the present process is exceptionally advantageous in providing a shatterproof envelope for television picture tubes which are evacuated to very low pressures. By following ordinary drape-forming conditions, that is, by preheating the shaped film without applying additional heat upon pertinent areas, excessive compressive forces tend to be exerted upon the tube, and such excessive compressive forces are very likely to set off an implosion-explosion reaction in the picture tube. The present process is also exceptionally useful in enveloping other types of breakable containers and electric lamps which are either evacuated and/or are protected by extremely thin sections of glass.

I claim:

1. A process of closely enveloping at least a portion of the surface of a shaped object in a film of polyethylene terephthalate which comprises clamping a sheet of polyethylene terephthalate film around its perimeter, heating selected areas of the film to a temperature within the range of from at least the softening temperature of the film to a temperature 10° C. below the crystalline melting point of the film, heating the remaining areas of the film which are to be stretched to a greater degree than said selected areas to conform to the contours of said shaped object to a higher temperature within said range, immediately thereafter draping the heated film over the surface to be enveloped, and thereafter, while continuing to heat said remaining areas of the film to said higher temperature, applying uniform pressure upon the film to shape the film snugly against the shaped object and bring the film into contact with the whole surface area to be enveloped, and cooling the film while maintaining the applied pressure.

2. The process, according to claim 1, wherein the film is oriented polyethylene terephthalate film.

3. The process, according to claim 1, wherein the film is biaxially-oriented, heat-set polyethylene terephthalate film.

4. A process, according to claim 1, wherein at least a portion of the surface of the film is adhered to the object by means of an intermediate layer of adhesive.

5. A process for covering the face of a television picture tube with a film of polyethylene terephthalate which comprises clamping a sheet of polyethylene terephthalate film around its perimeter, heating the area of the film that is to contact the face of the tube to a temperature within the range of from 150° C. to a temperature 10° C. below the crystalline melting point of the film, heating the area of the film surrounding the first-named area to a higher temperature within said range, immediately thereafter draping the heated film over the face and sides of the tube, and thereafter, while continuing to heat said surrounding area at a temperature within said range, applying uniform pressure upon the film to press the film into skin-tight contact with the face and surrounding adjacent side areas of the tube, and cooling the film while maintaining the applied pressure.

6. The process, according to claim 5, wherein the film is biaxially-oriented, heat-set polyethylene terephthalate film.

7. The process, according to claim 5, wherein the area of the film in contact with the side areas of the tube is adhered to the tube by an intermediate layer of adhesive.

References Cited in the file of this patent

UNITED STATES PATENTS

| | | |
|---|---|---|
| 2,497,376 | Swallow et al. | Feb. 14, 1950 |
| 2,531,540 | Smith | Nov. 28, 1950 |
| 2,650,213 | Hofrichter | Aug. 25, 1953 |
| 2,690,593 | Abercrombie | Oct. 5, 1954 |
| 2,719,100 | Banigan | Sept. 27, 1955 |
| 2,731,654 | Nowak | Jan. 24, 1956 |
| 2,749,572 | Nowak | June 12, 1956 |